United States Patent [19]

Triporo et al.

[11] Patent Number: 4,634,365
[45] Date of Patent: Jan. 6, 1987

[54] APPARATUS FOR MAKING PIZZA

[75] Inventors: Pedro R. Triporo, 1012 Sean Ct., Hurst, Tex. 76053; Stanley Eckels, Ft. Worth, Tex.

[73] Assignee: Pedro R. Triporo, Hurst, Tex.

[21] Appl. No.: 620,424

[22] Filed: Jun. 14, 1984

[51] Int. Cl.[4] .................. A21C 7/04; A21C 11/00
[52] U.S. Cl. ..................... 425/398; 425/428; 425/406
[58] Field of Search ............ 99/353, 443 C, ; 425/398, 428, 430, 431, 406

[56] References Cited

U.S. PATENT DOCUMENTS

| | | | |
|---|---|---|---|
| 1,841,507 | 1/1932 | Trompeter | 425/398 |
| 2,190,483 | 2/1940 | Pacilio | 425/429 |
| 2,596,388 | 5/1952 | Elvis | 425/398 |
| 3,228,066 | 1/1966 | Rippstein | 425/398 |
| 3,307,502 | 3/1967 | Armour | 425/398 |
| 3,375,791 | 4/1968 | Pakula | 425/398 |
| 3,381,632 | 5/1968 | Pontecorvo | 425/365 |
| 3,390,645 | 7/1968 | Pacilio | 99/353 |
| 3,735,692 | 5/1973 | Marchignoni | 425/162 |
| 3,780,643 | 12/1973 | Papai | 425/346 |
| 3,814,005 | 6/1974 | Widdel | 99/349 |
| 3,947,204 | 3/1976 | Ayres et al. | 425/398 |
| 3,949,660 | 4/1976 | Kuhlman | 99/352 |
| 4,060,027 | 11/1977 | Jenny | 99/450.1 |
| 4,116,119 | 9/1978 | Kuhlman | 99/450.6 |
| 4,251,549 | 2/1981 | Fournet | 426/19 |
| 4,417,867 | 11/1983 | Bauer | 425/398 |
| 4,464,405 | 8/1984 | DeChristopher | 426/496 |

FOREIGN PATENT DOCUMENTS

182480 8/1923 United Kingdom ............... 425/431

Primary Examiner—Willard E. Hoag
Attorney, Agent, or Firm—Arnold, White & Durkee

[57] ABSTRACT

A system is provided for forming pizza dough and similar material into a pie shape by a series of progressively deeper tamping motions. Apparatus is provided for achieving such tamping, as are a conveyor to carry dough into registry with the tamping apparatus and then to a topping station and an oven.

9 Claims, 8 Drawing Figures

APPARATUS FOR MAKING PIZZA

BACKGROUND OF THE INVENTION

This invention relates to a system for forming and baking food items such as pizza pies from plastic material such as pizza dough. The invention includes in particular apparatus for tamping dough into a desired pie shape.

Pizza is a popular food item in restaurants. A number of restaurants, including several widely-known franchise chains, specialize in preparing and serving pizza pies of various sizes with various toppings.

The preparation of pizza in a restaurant tends to be labor-intensive and concomitantly expensive. The pie must be formed from a mass of dough; the image of a cook tossing and spinning dough over his or her head has long been one associated with "pizzerias." After the pie is formed, it must be covered with appropriate toppings, placed in an oven for baking, and removed after an appropriate baking time. For maximum customer satisfaction the pizza should be served fresh from the oven. All of these steps can require expensive human involvement.

The prior art discloses a number of devices for automating various steps in the pizza preparation process. For example, U.S. Pat. No. 4,060,027, to Jenny, shows a stepwise advancing conveyor band and work stations along the conveyor band at which ingredients are applied to an edible product. As another example, U.S. Pat. No. 3,780,643, to Papai, shows a machine featuring an indexing conveyor belt which delivers partially baked pizza pie shells to various filling stations where tomato paste, grated cheese, and pepperoni are automatically applied.

Some of the prior devices are designed to form a mass of dough into a pie shape. U.S. Pat. Nos. 2,190,483 and 3,390,645, each to Pacilio, describe pie-forming apparatus which spin the dough mass to simulate a human cook's tossing and spinning action. U.S. Pat. Nos. 3,949,660 and 4,116,119, each to Kuhlman; 3,735,692, to Marchignoni; 3,814,005, to Widdel; and 4,251,549, to Fournet, describes apparatus for pressing or stamping dough into a pie shape. U.S. Pat. No. 3,381,632, to Pontecorvo, on the other hand, describe apparatus wherein dough is fed between male and female rollers and thereby flattened into a thin wafer.

Forming a pie by pressing, stamping, or rolling dough, unfortunately, can press a substantial amount of air out of the dough, resulting in a pie which, when baked, is undesirably brittle and cracker-like in consistency. Such a pie may be regarded as less tasty by customers, and there is some indication that it may be less digestible, than a pie in which air remains in the dough.

It is well known to flatten dough into a pie shape by tamping it with the fingers. Where pizza dough is concerned, this method of flattening is thought to be advantageous over other methods such as pressing, rolling, or stamping, because tamping is thought to allow more air to remain in the dough. In particular, the crust of the resulting pie, when baked, is believed to be tastier and more digestible than ones formed by one of the other methods.

Unfortunately, the procedure of hand tamping is time consuming and generally expensive. The procedure is also highly variable, since it is unlikely that any two persons tamp dough in an equivalent manner or with equivalent results. It is also unlikely that the same person will consistently turn out uniform products because of a number of factors.

SUMMARY OF THE INVENTION

The present invention provides a system for tamping dough into pizza shells, pie shells, and similar pastry products which will be more consistent than existing systems. The invention permits making such products which possess the characteristics associated with hand-tamped products, but at lower cost and greater speed.

The invention comprises, in general, a system in which a pan carrying a quantity of dough moves along a path concomitantly with a system which engages the dough in a series of relative rotational and axial motions to work and shape the dough into a desired form.

In one form of the invention, the system for working and forming a given portion of dough comprises a plurality of axially parallel members projecting from a common head or support member. The free ends of the projecting members span an area which corresponds generally to the area of the pan which carries the dough. The support member with its depending projecting members is centered directly above the pan, and the support member and the pan are then moved along a common travel path for a time sufficient for the dough on the pan to be tamped into a pie shell.

The tamping is carried out by a thrusting motion at successively different positions relative to the pan. More especially, the projecting members are moved in a longitudinal, reciprocating manner such that a projecting member contacts and depresses the dough on the pan. Between thrusts the projecting member is rotated about its longitudinal axis. Successive longitudinal thrusts of the projecting member are preferably varied such that the lowest point of travel of each successive thrust is closer to the pan on which the dough is carried.

As a result of the combined motions, the dough is progressively tamped on the plate to take the desired shape. At this point, the projecting member and the pan cease traveling together and the pan passes on for further processing. The projecting member, on the other hand, is returned to engage another batch of dough.

BRIEF DESCRIPTION OF THE DRAWINGS

FIG. 3 is a side cross-sectional view, and

Throughout the following detailed description, similar reference numerals refer to similar elements in all Figures of the drawings.

DETAILED DESCRIPTION OF THE INVENTION

Figure 1:
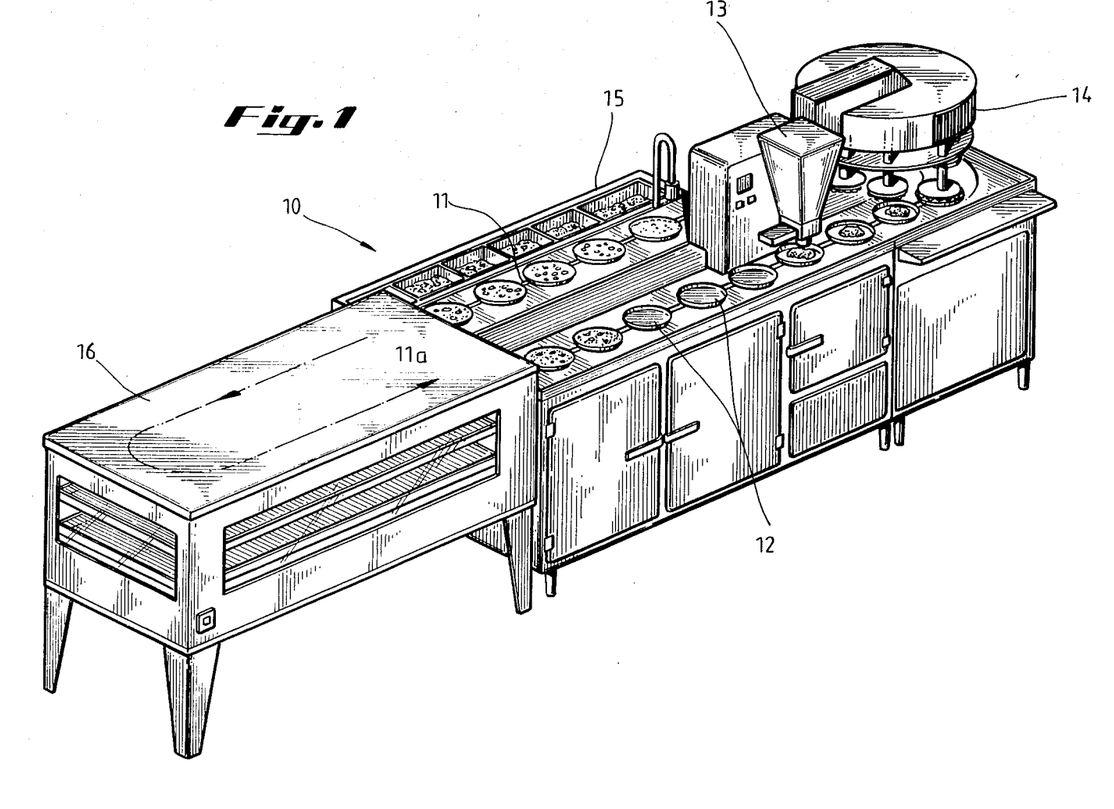
FIG. 1 is a perspective view of a preferred embodiment of the invention.

FIG. 1 provides an overview of the construction and operation of a preferred embodiment of the invention. There is shown a pizza making machine 10 constructed in accordance with the invention. An endless belt or chain 11 is arranged to carry one or more pans 12 on which dough may be deposited either manually or by suitable mechanical means at a filling station 13, in the direction indicated by the arrow 11a. The chain 11 carries the pans 12 past a tamping assembly 14, where any dough is tamped into a pie, and a topping station 15 where desired toppings may be placed on the pie.

The chain 11 then carries the pans 12 through an oven 16. Any pies on the pans 12 are baked while passing through the oven 16 for a time determined by the size of the oven and the speed of travel of the chain 11. Finished pies may be removed from the an 12 as they emerge from the oven.

Figure 7:
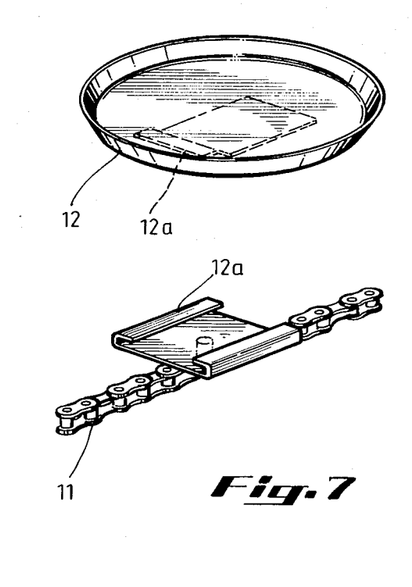
FIG. 7 is a pictorial representation of a pan and pan holder arrangement used in the preferred embodiment.

The chain 11 is driven by suitable means such as an electric motor, not here shown. Movement of the chain 11 is synchronized with the tamping action carried out by tamping assembly 14. The pans 12 are preferably removably attached to the chain 11 by any number of known methods; in the present embodiment this attachment is by a bracket-and-clip combination 12a shown in FIG. 7.

The apparatus shown is conveniently mounted on and about a table structure under which storage and refrigeration units may usefully be installed.

Referring now to FIGS. 2 through 8, the construction and operation of the tamping assembly 14 are considered in more detail.

The tamping assembly 14 of the present invention tamps dough previously deposited on a pan 12 into a pie, as the pan 12 is carried around and beneath the tamping assembly 14 by the chain 11. The tamping assembly 14 includes at least one plunger assembly 20. The plunger assembly, in turn, preferably includes a number of tamping projections 21 mounted to the underside of a spreader plate 22. The spreader plate 22 is rotably affixed to the lower end of a plunger shaft 23 and is interconnected with said lower end by a spring 24.

The tamping assembly 14 is configured to move the plunger assembly 20 in a relatively complex manner, as described in more detail below.

PLUNGER FOLLOWING MOTION

Figure 2:
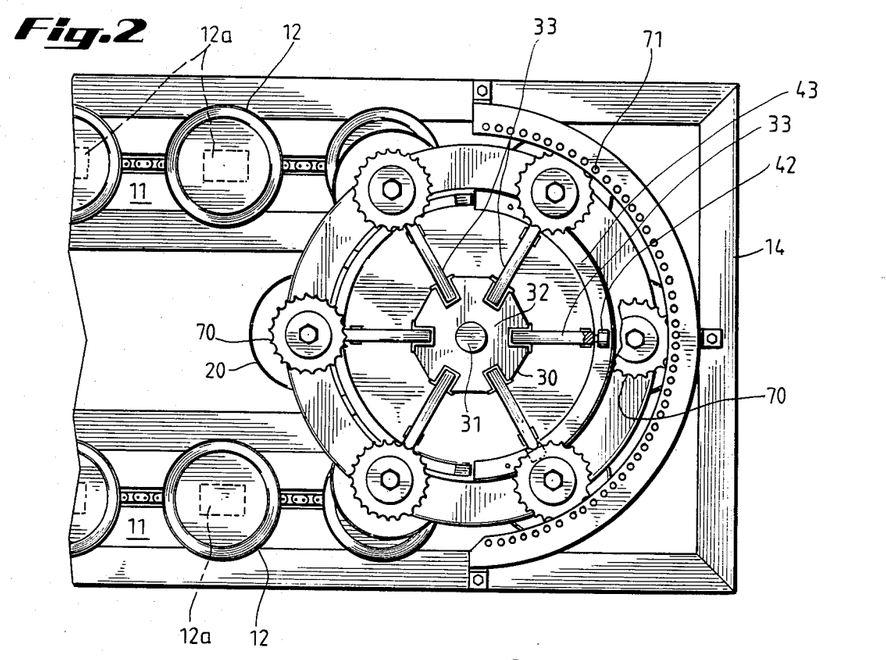
FIG. 2 is a top view of the dough-tamping assembly of the preferred embodiment.

The tamping assembly 14 carries one or more plunger assemblies 20; in the embodiment shown the tamping assembly carries six plunger assemblies. The plunger assemblies 20 are peripherally spaced to correspond to the linear spacing between the pans 12. Thus, by synchronizing the rotational movement of the tamping assembly 14 and, concomitantly, the plunger assemblies 20 with the movement of the pans 12, a single plunger assembly is continuously positioned over each pan 12 as the pans travel around the tamping assembly 14. In the embodiment shown, this synchronism is achieved by driving the chain 11 and the tamping assembly 14 from a common electric motor drive means with appropriate timing means, not shown.

Figure 3:
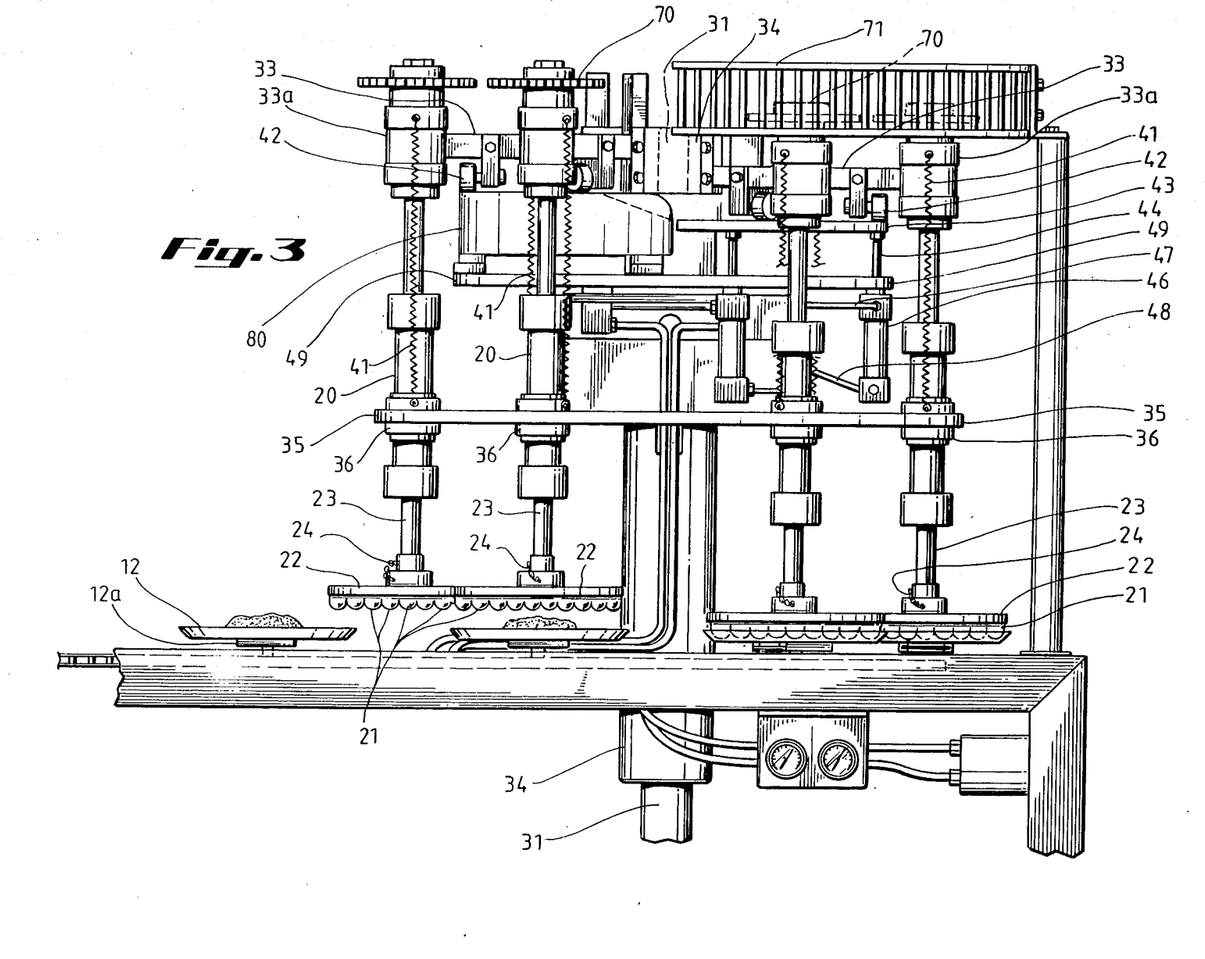

In the tamping assembly 14, a head assembly 30 includes a head 32 which is attached to and rotably driven by a main drive shaft 31. As indicated in FIG. 3, the drive shaft 31 extends vertically up through the endless chain 11 from an electric drive, not shown. The head 32, in turn, drives each plunger assembly 20 rotationally around the tamping assembly by a plurality of laterally disposed drive arms 33 which extend radially from the shaft 31.

Each arm 33 is coupled at one end to the head 32 in such a way as to enable the arm to move vertically up and down relative to the head 32 without disengaging. Thus, the head-end of each arm 33 can be a laterally disposed T, and each end of the cross-bar of the T can move or float within a vertical shaft or guide formed in the head 32, with appropriate bearing surfaces such as ball bearings or wheel-like cam followers being used to reduce friction and wear.

The opposite end of each arm 33 is attached to a guide bushing 33a in which the plunger shaft 23 is free to rotate. Thus, as the head 32 rotates, it carries with it the plunger assemblies 20.

PLUNGER THRUSTING MOTION

Figure 5:
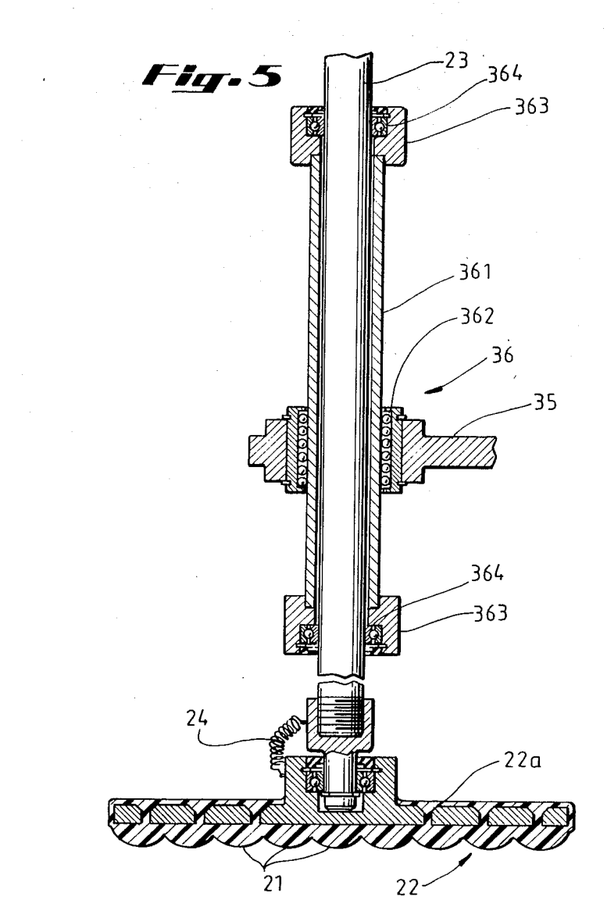
FIG. 5 is a cross-sectional view of a plunger assembly included in the dough-tamping assembly along the line 5—5.

Each plunger assembly 20 includes a plunger shaft 23 which has a spreader plate 22 at its lower end and a sprocket 70 at its upper end. The lower face of the spreader plate 22 has a plurality of projections 21 distributed over its surface. These projections can be of a wide variety of configurations suitable for engaging dough in a thrusting and rotational motion.

In general, rounded, blunt members about one inch in diameter and about one-quarter inch high have been found to be quite effective as projections. The projections 21 can be made of a variety of materials; projections made of a silicon material have been observed to be very effective.

Figure 6:
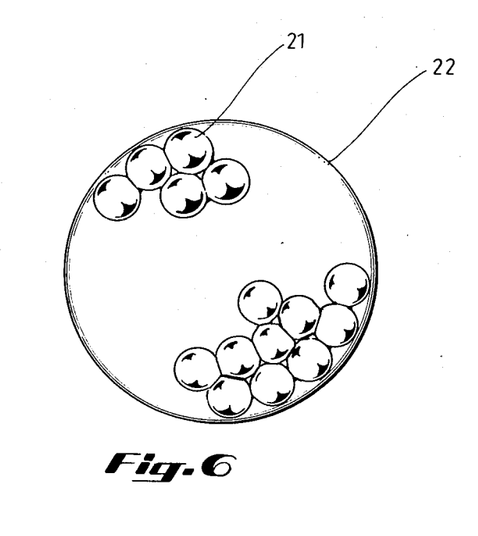
FIG. 6 is a bottom view of a spreader plate included in the plunging assembly.

In the embodiment shown the projections 21 approximate the shape of balls about one inch in diameter protruding from the spreader plate 22 a distance less than their radius. This limited protrusion avoids leaving spaces between the projections and the spreader plate in which dough could be unsanitarily trapped. To this end the projections are formed with a slight overlap, as shown in FIG. 6. In addition, the projections 21 shown protrude slightly less at the periphery of the spreader plate 22 than at the center. This arrangement of projections gives the tamped pie the general form of a very shallow dish.

The projections 21 may be formed on the spreader plate 22 in any number of known ways. For example, the spreader plate 22 may be manufactured with a number of ducts 22a passing therethrough, as shown particularly in FIG. 5. The spreader plate may then be immersed in a mold of suitable shape which is then filled with a pourable, epoxy-like silicon material to surround the spreader plate and fill the ducts 22a. The material is then allowed to harden; the unitary construction and filled ducts results in a strong mechanical bond between the spreader plate 22 and the projections 21.

At a point intermediate its ends and below the lifting arm 33, the plunger shaft 23 passes through a guide bearing assembly 36. The guide bearing assembly 36 is configured to permit the plunger shaft to move both vertically and rotationally.

In the present embodiment, as shown particularly in FIG. 5, the guide bearing assembly 36 includes a vertically disposed hollow tube 361 slidably mounted within a bearing 362 affixed to and passing through a laterally disposed guide plate 35. A separate hollow cap 363 having an opening substantially equal in diameter to that of the tube 361 is affixed to each of the top and the bottom of the tube 361.

The shaft 23 passes through the tube 361 and the opening in each of the caps 363; the inner diameters of the tube 361 and the caps 363 are of a size to permit a suitable clearance. Rotatably mounted within the hollow of each cap 363 is a ball bearing race affixed by suitable means, such as pressing, to the shaft 23.

The bearing assembly 36 thus permits the shaft 23 to rotate about its axis, with the ball bearing race 364 serving as a bearing surface. Vertical movement by the shaft 23 may also take place, with the bearing 362 serving as a bearing surface for the tube 361, which moves vertically with the shaft 23.

The guide plate 35 is rotationally mounted, using a bushing not shown, to a stationary hollow support shaft 34 and rotates around that shaft. The shaft 34 is floor- or table-mounted as desired, it is axially concentric with the drive shaft 31, and the shaft 31 rotates within the shaft 34.

Spring bias against cam

A spring 41 interconnects each arm 33 with rotating guide plate 35 and is biased to urge the arm 33 toward the guide plate 35. Mounted on the underside of the each arm 35 is a cam follower 42. Each cam follower 42, in turn, rides on a cam 43. The cam 43 is supported by one or more piston rods 44. The cam 43 is conveniently a semi-circular band or a half-moon to support the cam followers 42 as they rotate around the tamping assembly 14.

The vertical profile or taper of the cam 43 is thicker at one end (where the cam followers 42 first engage the cam) than at its other end (where the cam followers 42 disengage from the cam). Thus, as a given cam follower 42 rolls around the cam 43, the particular spreader plate 22 associated with the cam follower will tend to move closer to the pan 12 traveling with the tamping plate.

Each cam follower 42 is axially and rigidly supported from its respective arm 33. Thus, as any given cam follower 42 is vertically displaced by rolling along the cam 43, it will cause its arm 33 to be similarly disposed against the resistance provided by the spring 41.

Hydraulic lifter

Additional vertical displacement of the cam follower 42, and thus of the arm 33 and the plunger assembly 20, is caused by the piston rods 44 as they are reciprocated vertically by hydraulically actuated pistons 45 in cylinders 46. Preferably, the cam 43 is mounted on three such piston/cylinder combinations spaced about the cam 43. Each such combination is filled with a working fluid.

Figure 4:
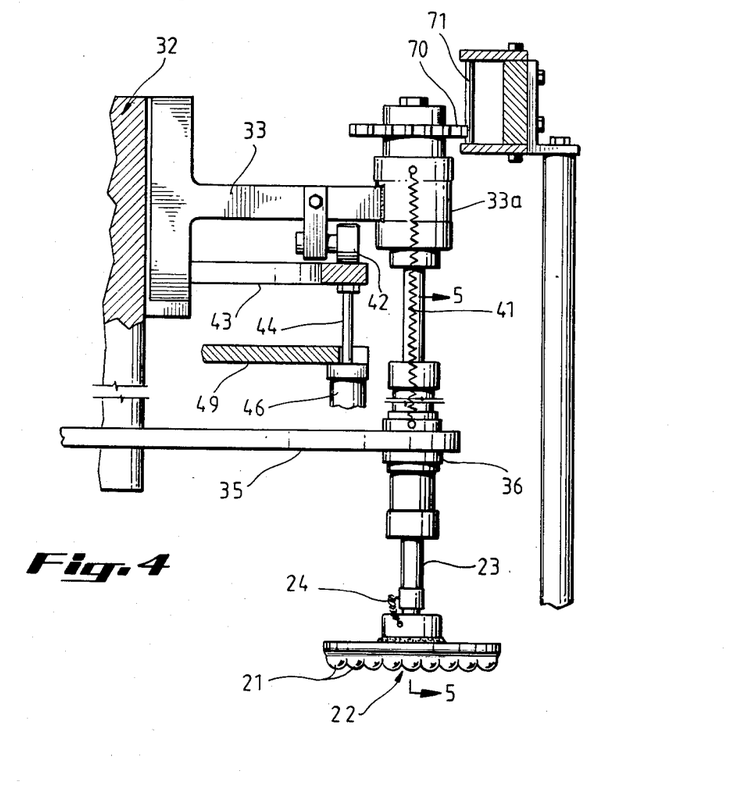
FIG. 4 a partial cross-sectional view, of the dough-tamping assembly.

Referring to FIG. 4, each piston 45 is double acting and may be thought of as dividing the corresponding cylinder 46 into an upper half and a lower half. An upper hydraulic line 47 permits fluid communication between the upper half of each cylinder 46 and a first manifold 51; likewise, a lower hydraulic line 48 permits fluid communication between the lower half of each cylinder 46 and a second manifold 52. The hydraulic lines 47 and 48 penetrate each cylinder 46 and the manifolds 51 and 52 in a manner that will be well known to those skilled in the art having the benefit of this disclosure. In the embodiment shown, the cylinders 46 are attached to the underside of a horizontally disposed support plate 49; the piston rods 45 pass vertically through openings (not shown) in the support plate.

Figure 8:
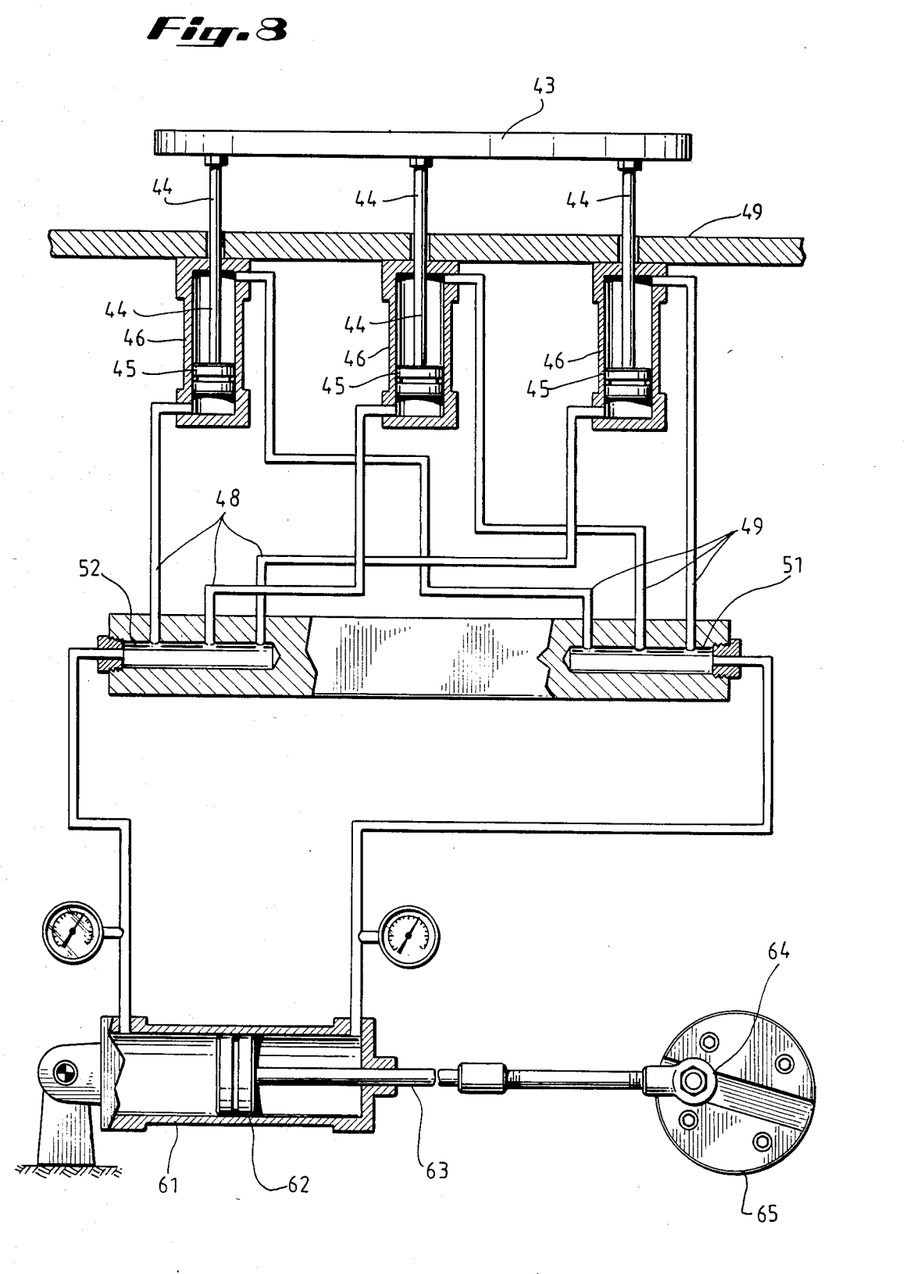
FIG. 8 is a pictorial schematic of a portion of a hydraulic lifting assembly incorporated in the preferred embodiment.

Working fluid pressure to reciprocate the pistons 45, and thus the cam 43, in a generally vertical direction is provided by a piston-cylinder combination similar to that just described and driven by an electrically powered drive means. A driving cylinder 61 may be thought of as being divided into a first part and a second part by a driving piston 62, to which a driving piston rod 63 is attached.

Hydraulic line 66 permits fluid communication between the first part of the cylinder 61 and the manifold 52; similarly, hydraulic line 67 permits fluid communication between the second part of the cylinder 61 and the manifold 51. Cylinder 61, hydraulic lines 66 and 67, and the manifolds 51 and 52, like cylinder 46, are filled with working fluid, thus completing two separate, closed hydraulic systems.

Driving piston rod 63 is attached to a selected point 64 on a reciprocating wheel 65, which in turn is rotated at a selected speed by a variable-speed electric motor (not shown). As the wheel 65 is rotated, piston rod 63 reciprocates piston 62 within cylinder 61. The manner of attaching the piston rod 63 to the wheel 65, and of rotating the wheel 65, will be well known to those skilled in the art having the benefit of this disclosure.

Thrusting Motion Operation

The combined action of spring pressure and hydraulic pressure described above results in reciprocating thrusting motion of the plunger assembly 20. The configuration of the cam 43 further results in a graduated thrusting motion as the plunger assembly 20 follows the pan 12.

Movement of the driving piston 62 in the appropriate direction (which will be determined by the arrangement of hydraulic lines 66 and 67 with respect to the cylinder 61) by the wheel 65 and the piston rod 63 increases the working fluid pressure in the manifold 52 and the lower parts of the cylinders 46. This increased pressure drives the cam lifting piston 45 upward. This in turn lifts the cam 43 and, through the cam follower 42, the plunger assembly 20. The upward motion of the plunger assembly 20 stretches the spring 41.

As the wheel 65 continues to rotate, the driving piston 62 reaches its maximum travel in the first direction and begins to move in the opposite direction. This action similarly drives the piston 45 downward, whereupon the spring 41, anchored to the guide plate 35, concomitantly pulls the plunger assembly back down, against any dough carried by the pan 12.

It will be apparent to those skilled in the art having the benefit of this disclosure that the height to which the plunger assembly 20 is lifted will be determined by the stroke of the driving piston 63, which itself may be regulated by adjusting the point 64 on the reciprocating wheel 65 at which the driving piston 63 is attached. It will be further apparent that the frequency of lifting cycles will be determined by the rotational speed of the wheel 65, which may be regulated by adjusting the speed of the variable speed motor.

A graduated tamping action is desirable in tamping pizza dough, with successive thrusts being generally deeper into the dough, to achieve a more even shape of the pie. As noted earlier, the cam 43 is constructed to be appropriately thicker at the beginning point of the travel of the cam follower 42 around the cam 43 than at the end point of the travel. The cam follower 42 therefore falls with respect to the cam 43 as it travels, permitting the spring 41 to pull the plunger assembly 20 deeper into the dough with successive thrusts and achieving the desired graduation.

PLUNGER ROTATION

The tamping assembly 14 rotates the plunger assembly 20, causing the projections 21 to make contact with the dough at different points relative to the pan 12 upon successive thrusts, achieving a more even consistency of the tamped pie. The spreader plate 22, however, is rotated only when not in contact with the dough, thus avoiding working the dough off the pan 12 by the twisting motion.

Continual step-wise rotation of the plunger assembly 20 is achieved by the cooperating of a sprocket 70, affixed to the top of each plunger shaft 23, with a rack 71. The generally semi-circular or crescent-shaped rack 71 is fixedly mounted approximately concentrically with the generally semi-circular cam 43 at a height to engage the sprocket 70.

As the plunger assembly 20 is carried into contact with the rack 71 by the rotation of the head 32, the rack 71 engages the sprocket 70. Rotation of the head assembly 30 thus causes the sprocket 70 to rotate as it rolls along the rack 71. Rotation of the sprocket 70, in turn, causes its attached plunger shaft 23 to be rotated within guide bushing 33a and guide bearing assembly 36.

Friction prevents the spreader plate 22, mounted for rotation on the plunger shaft 23, from being rotated when it is in contact with the dough. Rotation of the plunger shaft 23 during this time, however, stretches the spring 24. When the plunger assembly 20 is reciprocated off the dough, the spring 24 exerts a torsional force against the spreader plate 22, causing it to rotate to catch up with the plunger shaft 23. This desirably avoids twisting the dough itself, which could result in the dough being worked on, and eventually off, the pan 12.

GENERAL OPERATION

Referring to FIG. 1, the invention provides a coordinated system for preparing pizzas and similar products with improved consistency in quality and reduced manpower. The system essentially begins its operation as the chain 11 with empty pans 12 approaches the dough depositing station 13. A batch of pizza dough is placed on one or more pans 12 as desired.

The chain 11 then proceeds to carry each batch of dough to the tamping assembly 14, where the pan 12 meets and travels along with a separate plunger assembly 20. At this point, the cam follower 42 of the plunger assembly 20 contacts the cam 43 and proceeds to roll along the profile of the cam.

Concomitantly two other events occur. First, the cam 43 is reciprocated vertically by the piston rods 44, and the plunger assembly 20 is reciprocated vertically by the motion of the cam 43 and by the spring 41; and second, the plunger shaft 23 is rotated by the sprocket 70 rolling along the rack 71, rotating the spreader plate 22 when the projections 21 are out of contact with the dough. This combination of actions continues until the pan 12 with its batch of dough and its plunger assembly 20 completes its travel around the tamping assembly 14.

At this point the pan 12 with its pie shell continues with the chain 11 past the topping station 15 and thence into the oven 16. Meanwhile, the cam follower 42 of the arm 33 rolls off the cam 43 onto an idler cam 80 mounted on the support plate 49.

The idler cam 80 is generally semi-circular or crescent shaped; it is profiled to have a relatively high central portion between two relatively low ends. The inclination at one end (where the cam followers 42 first engage the idler cam) is relatively shallow to permit the cam followers to engage the idler cam smoothly. The declination at the other end (where the cam followers 42 disengage from the idler cam 80) may be relatively steep, as shown.

As each batch of dough passes through the tamping station, it is tamped into a pie shell. The shells thereby produced are generally uniform in their characteristics.

It will be apparent that a range of operating conditions is possible for the tamping operation. It is generally preferred, however, that each batch of dough received about 40 to 50 tampings of a stroke of about ⅝ to ¾ inch each with its corresponding spreader plate 22 being rotated about three revolutions during the tamping.

It will be appreciated by those skilled in the art having the benefit of this disclosure that this invention is believed to be capable of application in other situations. Accordingly, this description is to be construed as illustrative only and as for the purpose of teaching those skilled in the art the manner of carrying out the invention.

It is also to be understood that the form of the invention shown and described is to be taken as the presently preferred embodiment. Various modifications and changes may be made, e.g., in the shape, size, and arrangement of parts, without departing from the spirit and scope of the invention as set forth below in the claims; it is intended that the following claims be interpreted to embrace all such modifications and changes.

What is claimed is:

1. An apparatus for preparing a pie shell from a batch of dough, said apparatus comprising:
   (a) a conveyor adapted to carry a pan of dough;
   (b) a tamping device adapted to travel laterally along with and above the pan;
   (c) reciprocating drive means to repeatedly lower said device into contact with the dough;
   (d) means to vary the vertical travel of the drive; and
   (e) means to rotate said tamping device during such lateral and vertical travel.

2. The apparatus of claim 1, wherein said tamping device comprises:
   (a) a substantially flat surface member facing toward the dough; and
   (b) a plurality of projections distributed over said surface member to engage the dough.

3. The apparatus of claim 1 wherein said means to vary the vertical travel of the drive comprises a cam interposed between the drive means and the dough.

4. The apparatus of claim 1 wherein said conveyor means comprises an endless chain.

5. Apparatus for forming a batch of dough on a pan into a shell conforming to the shape of the pan, comprising:
   (a) a horizontally disposed tamping member with generally flat top and bottom surfaces whose periphery conforms to the periphery of the pan;
   (b) a plurality of projections distributed over said bottom surface;
   (c) a substantially vertical shaft coaxially attached to the top surface of said tamping member;

(d) first reciprocating drive means adapted to impart a first vertical reciprocating displacement of said shaft along its longitudinal axis;

(e) second drive means to superimpose a second, progressively different vertical, axial displacement on said shaft for each said first reciprocating displacement;

(f) third drive means to rotate said shaft about its longitudinal axis;

(g) positioning means to bring said tamping member into registry with said pan such that said bottom surface of said tamping member contacts said batch of dough on said pan.

6. Apparatus for forming batches of dough into pie shells comprising:

(a) a chain adapted to move in a closed path with a curved section;

(b) one or more pans equally spaced along said chain;

(c) a rotatable, vertically disposed drive shaft substantially coaxial with the center of curvature of said curved section;

(d) one or more laterally disposed arms extending radially from said shaft at substantially equal arcuate spacings, a radially inner end of each arm interengaging said shaft in a manner enabling said arm to move a preselected range of distances along said shaft;

(e) a separate bushing connected to a radially outer end of each of said arms, each said bushing configured to have its longitudinal axis substantially vertical and circumferentially spaced from the axis of each adjacent bushing a distance substantially equal to the spacing between said pans;

(f) a separate, vertically disposed plunger shaft rotatably fitted within each said bushing;

(g) a separate sprocket wheel attached to an upper end of each said plunger shaft so as to rotate in a substantially horizontal plane;

(h) a separate, horizontally disposed, flat member rotatably attached substantially at the center of a top surface thereof to a lower end of each said plunger shaft, and configured to fit within said pans;

(i) a plurality of projecting members distributed over a bottom surface of each said flat member and configured to tamp said dough;

(j) spring means interconnecting said flat member and said plunger shaft;

(k) power transmission means to rotate said drive shaft from a power source and concomitantly to drive said chain such that successive said flat members are brought into registry with successive said pans;

(l) a horizontally disposed, substantially circular guide plate attached at its center to said drive shaft between the ends of the drive shaft so as to rotate with said drive shaft;

(m) a separate guide bearing assembly attached at the periphery of said guide plate for each plunger shaft and adapted to receive its plunger shaft in a slidable and rotatable relation;

(n) a horizontally disposed, substantially semi-circular cam centered around said drive shaft and supported separately from said drive shaft above said guide plate, an upper surface of said cam declining in height along its periphery in a preselected manner in the direction of rotation of said drive shaft;

(o) a separate cam follower supported by and below each said arm to follow the declination in the top surface of said cam upon rotation of said arms with said drive shaft;

(p) a separate spring member interconnecting each said arm with said guide plate to urge said arm toward said guide plate;

(q) at least one double-acting hydraulically actuated piston and cylinder assembly positioned below said cam to support said cam on said piston and to move said cam vertically upon movement of said piston; and (r) a curved, horizontally disposed rack having teeth along its inner surface adapted to engage said sprockets, said rack supported independently of said drive shaft in the plane of said sprockets so as to engage the sprockets when their corresponding plunger shafts and flat members come into registry with said plate members.

7. Apparatus as defined in claim 6, including an oven positioned along the track of said chain to receive said pans bearing pans and pie shells.

8. Apparatus for forming batches of dough into pie shells comprising:

(a) a conveyor adapted to carry a plurality of pie pans at substantially equal spacings along a laterally disposed path which includes a curved section;

(b) a vertically disposed drive shaft positioned at the center of curvature of said curved section;

(c) a plurality of vertically disposed tamps supported from said drive shaft in a generally circular array around said drive shaft such that the peripheral spacing between the vertical axes of said tamps is substantially equal to the peripheral spacing between the centers of said pie pans in said curved section;

(d) drive transmission means to move said conveyor concomitantaly with said rotation of said drive shaft such that each said pie pan will be in vertical registry with a separate tamp during movement of said pie pan around said curved section;

(e) means to move each said tamp in repeated and successively greater axial strokes to repeatedly contact the dough in its respective pie pan;

(f) a substantially flat and horizontal face at the bottom of each tamp configured to mate with its respective pie pan, each such face having a plurality of projections distributed thereon to apply pressure to the batch of dough in said pie pan; and (g) means to rotate each tamp around its vertical axis concomitantly with said tamping strokes.

9. The apparatus of claim 8 wherein said plunger assembly includes means for decreasing, with each successive reciprocation, the predetermined distance from the pan at which the tamping projection is brought into contact with the dough.

* * * * *